(12) United States Patent
Papasakellariou et al.

(10) Patent No.: US 7,369,523 B2
(45) Date of Patent: May 6, 2008

(54) DATA SIGNAL DEMODULATION IN A COMMUNICATION SYSTEM

(75) Inventors: Aris Papasakellariou, Dallas, TX (US); Timothy Schmidl, Dallas, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1007 days.

(21) Appl. No.: 10/370,991

(22) Filed: Feb. 20, 2003

(65) Prior Publication Data

US 2003/0156563 A1   Aug. 21, 2003

Related U.S. Application Data

(60) Provisional application No. 60/359,220, filed on Feb. 20, 2002.

(51) Int. Cl.
*H04B 7/216* (2006.01)
*H04B 7/24* (2006.01)
*H04B 17/00* (2006.01)
*H04Q 7/00* (2006.01)

(52) U.S. Cl. .............. 370/328; 370/335; 370/342; 455/39; 455/226.1

(58) Field of Classification Search .............. None
See application file for complete search history.

(56) References Cited

U.S. PATENT DOCUMENTS 6,271,981 B1 * 8/2001 Hatae ................. 360/77.14
6,763,076 B1 * 7/2004 Glavieux et al. ........... 375/346
6,807,429 B2 * 10/2004 Subrahmanya ............. 455/522
6,931,050 B1 * 8/2005 Bottomley ................. 375/130
7,006,798 B2 * 2/2006 Miyoshi et al. .......... 455/67.11
7,035,659 B1 * 4/2006 Yang ......................... 455/522
7,082,174 B1 * 7/2006 Smee et al. ................ 375/349
7,123,645 B2 * 10/2006 Ishizu et al. ................ 375/147
7,184,497 B2 * 2/2007 Jeske et al. ................. 375/346

OTHER PUBLICATIONS

"Physical Layer Aspects of UTRA High Speed Downlink Packet Access", ETSI 3GPP 3G TR 25.848 (2002), TSG-RAN Working Group 1, Feb. 2002, Available on www.3gpp.org., pp. 1-89.
Pilot Power Ratio Signaling (Corrected), Sophia Antipolis, Motorola, (HSDPA Ad-Hoc), TSGR1-01-1087, France, Nov. 5-7, 2001, pp. 1-9.

* cited by examiner

*Primary Examiner*—Melanie Jagannathan
(74) *Attorney, Agent, or Firm*—Ronald O. Neerings; Wade James Brady, III; Frederick J. Telecky, Jr.

(57) ABSTRACT

A method described evaluates the pilot-to-data power ratio based on the values of the demodulated data at the output of a receiver such as a conventional maximal ratio combiner or an equalizer receiver. Since the data are not scaled to their particular decision grid, their distribution and statistics deviate from the ones defined by the known decision grid. Measuring these deviations of the statistics, the pilot-to-data power ratio and the appropriate demodulated data scaling can be accurately determined. Subsequent data processing may then commence.

18 Claims, 1 Drawing Sheet

DATA SIGNAL DEMODULATION IN A COMMUNICATION SYSTEM

This application claims priority under 35 USC § 119(e)(1) of provisional application Ser. No. 60/359,220, filed Feb. 20, 2002.

TECHNICAL FIELD

This invention relates in general to the field of communications, and more specifically to a method and apparatus for the demodulation of data signals in communication systems. It also relates to the determination of the data to pilot power ratio in a CDMA communication system.

BACKGROUND

Code division multiple access (CDMA) has been extensively used in such applications as cellular and satellite communications. CDMA signals increase the spectrum required for the transmission of a particular data rate by modulating each information symbol with a spread spectrum code having a rate larger than the data rate. The same spreading code is used for each information symbol. Typically, the spreading code comprises of a few tens or a few hundreds elements, called chips. To decrease the correlations among spreading codes assigned to different users and thereby reduce the interference among the different users, the data stream after spreading is typically scrambled with a pseudonoise (PN) code that is generated serially and cyclically and has a larger period than the spreading code. Examples of such CDMA signal spreading are the schemes used by the $3^{rd}$ Generation Partnership Project (3GPP) and 3GPP2 communication systems and their respective evolutions of High Speed Downlink Packet Access (HSDPA) and 1x-EVDV.

With CDMA, the signals from all users simultaneously occupy the same frequency band. The receiver discriminates the multiple signals by exploiting the properties of the spreading and scrambling codes that are applied to the signal of each user. The receiver attempts to match in time with the codes of the desired signal a replica of those spreading and scrambling codes. Only then the demodulation result is meaningful; otherwise it appears noise-like. Thus, if the arriving signals have different codes or different code offsets, they can be discriminated at the receiver.

The conventional receiver structure for CDMA signals is the well-known Rake receiver. The Rake receiver performs maximal ratio combining by multiplying each signal path with the conjugate of the corresponding channel estimate and then adding the individual results. The channel estimate is typically obtained through the use of a pilot signal. Alternatively, for Quadrature Amplitude Modulation (QAM) or M-ary Phase Shift Keying (MPSK) type modulation schemes, alternative receivers structures such as an equalizer or an interference canceller may be used to avoid the shortcomings of the Rake receiver when the signal is transmitted through a multipath-fading channel.

In order to successfully demodulate the data signal, the constellation of the corresponding data symbols after demodulation with any receiver type (Rake, equalizer, interference canceller) must have the distribution dictated by the particular modulation scheme. To achieve this objective, the data needs to be appropriately scaled. For example, for a Rake receiver or for an interference canceller incorporating the Rake receiver, the output of the maximal ratio combiner (MRC) must be scaled by the ratio of the data-to-pilot signal power. The same is true for an equalizer receiver using the pilot signal for training. The appropriate power ratio may be signaled by the transmitter, or alternatively, be computed at the receiver. The second option is preferable, if it can be implemented and does not lead to considerable performance losses, since it avoids the bandwidth consumption that would be otherwise needed for the signaling of the pilot-to-data power ratio. Computation of the data-to-pilot power ratio at the receiver is required by HSDPA and may be used for estimation of the data signal SNR, the noise variance, or for power control purposes as required by 3GPP and 3GPP2.

The conventional approach of measuring the data-to-pilot power ratio at the receiver is to compute the individual signal power or Signal-to-Noise Ratio (SNR) for both pilot and data signals. This requires measurement of the received signal over several data periods to obtain the necessary quantities (signal power or SNR) and thereby introduces processing delay. This latency in the demodulation process may place additional constraints in the receiver's design when a particular communications application is sensitive to delays or when feedback is required from the receiver in a timely manner. Moreover, there is some additional receiver complexity involved with the signal power or SNR estimation process. Also, the robustness of the previous estimates may not be good enough to ensure small performance losses under all possible channel conditions. This is because the signal may be in fading or there may be signal paths that are too weak to be identified or to close to be discriminated. Such situations may affect the accuracy of the power or SNR estimates and degrade the performance of a receiver relying on them to perform demodulation of the received signal.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
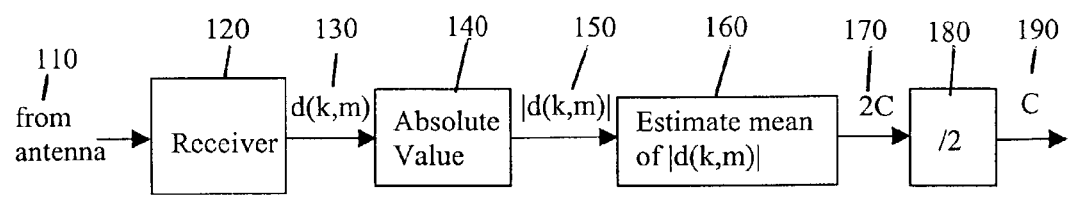
FIG. 1 shows a block diagram of a receiver in accordance with the invention.

While the specification concludes with claims defining the features of the invention that are regarded as novel, it is believed that the invention will be better understood from a consideration of the following description in conjunction with the drawing figure.

The approach considered in the present invention circumvents some of the shortcomings of the prior art approach previously mentioned by examining the data symbol statistics after demodulation and comparing them to the known statistics that the demodulated data symbols must have. Based on the results of this comparison, the appropriate scaling can be found to place the demodulated data symbols in their correct decision grid. The performance of this approach is thus tied to the performance of the receiver.

The preferred embodiment of the invention and its performance benefits relative to the established approach are now described. The 3GPP High-Speed Packet Downlink Access (HSPDA) format will be considered an exemplary setup to describe the invention. However, the invention also applies to the 3GPP Release 1999, 3GPP2, 1xEVDV, and to any other CDMA system employing simultaneous pilot and data transmission without knowledge of the data-to-pilot power ratio. It is worth noting that the invention is not restricted to CDMA communication systems and can be applied without modifications to any communication system in general.

The disclosed invention applies to any type of Phase Shift Keying (PSK) or QAM modulation as examples. The description of the invention will use 16-QAM as the exemplary modulation setup, however the invention is not so limited. Also, the description of the despreading and demodulation process will consider the use of a conventional Rake receiver, also typically used by an interference canceller. It is straightforward to apply the disclosed data scaling method to the demodulated data from an equalizer as well.

The exemplary embodiment of the invention will be the calculation of the data-to-pilot power ratio to scale a demodulated signal having amplitude information into the correct decision grid to perform the reverse of the transmitter information mapping. However, this clearly extends to other applications such as computing the data signal SNR based on the data-to-pilot power ratio and the pilot SNR, and to computing the noise variance needed for turbo coding. The SNR information may be used to provide a link quality indication. It may also be used for power control and does not depend on whether or not information is carried in the amplitude of the data signal.

In a HSDPA system, the mobile or user equipment (UE) such as a cellular telephone is assigned a number of orthogonal codes with Spreading Factor (SF) of 16. Also, a Common Pilot Channel (primary or secondary CPICH) is transmitted along with the High-Speed Data Channel (HS-DSCH). The SF of the CPICH is $SF_{CPICH}=256$ while the SF for each HS-DSCH channel is $SF_{HS-DSCH}=16$, thus $SF_{CPICH}/SF_{HS-DSCH}=16$. The CPICH serves, among other purposes, to provide channel estimates to Rake and interference canceller receivers or to train an equalizer type receiver. In every case, the result of Maximal Ratio Combining (MRC) or equalization for the HS-DSCH needs to be scaled by the HS-DSCH-to-CPICH power ratio in order to place the 16-QAM data symbols of HS-DSCH in the appropriate decision grid.

The output $p(k,l)$ of the CPICH despreader for the $k^{th}$ pilot symbol and the $l^{th}$ multipath component is given as:

$$p(k,l) = SF_{CPICH} \cdot \alpha(l)\sqrt{E_{cp}} + SF_{CPICH} \cdot n_p(k,l) \quad (1)$$

where $\alpha(l)$ is the complex coefficient associated with the $l^{th}$ path component, $E_{cp}$ is the received energy per pilot chip, and $n_p(k,l)$ is a zero-mean complex Gaussian noise process. The despread pilot symbol $p(k,l)$ may be accumulated over a period of $N_p$ pilot symbol periods to provide a better estimate for the pilot signal power which can be used for channel estimation or SNR evaluation. The period $N_p$ depends on the channel coherence time and the processing delay and complexity constraints of the receiver.

The output $d(k,l,m)$ of the HS-DSCH despreader corresponding to the $k^{th}$ symbol on the $m^{th}$ HS-DSCH code for the $l^{th}$ multipath component is given as:

$$d(k,l,m) = SF_{HS-DSCH} \cdot \alpha(l)\sqrt{E_{cd}} s(k,m) + SF_{HS-DSCH} \cdot n_d(k,l,m) \quad (2)$$

where $s(k,m)$ is the associated modulated symbol, $E_{cd}$ is the received energy per data chip, and $n_d(k,l,m)$ is a zero-mean complex Gaussian noise process. Assuming noise processes independent of the HS-DSCH multicode and symbol period, the variance $\sigma^2_p(l)$ for $n_p(k,l)$ and the variance $\sigma^2_d(l)$ for $n_d(k,l,m)$ are the same.

Performing MRC on $d(k,l,m)$ for all L multipath components based on the channel estimate provided by $p(k,l)$, the MRC output (assuming for notational simplicity a noiseless channel estimate—the effect of the noise component will be discussed later) after normalizing with the total $p(k,l)$ power over all multipaths is given as:

$$d(k,m) = \frac{\sum_{l=1}^{L} d(k,l,m) p^*(k,l)}{\frac{SF_{HS-DSCH}}{SF_{CPICH}} \sum_{l=1}^{L} |p(k,l)|^2} \quad (3)$$

$$= \frac{\sum_{l=1}^{L} \alpha(l)\sqrt{E_{cd}} s(k,m) \cdot \alpha^*(l)\sqrt{E_{cp}}}{\sum_{l=1}^{L} \left|\alpha(l)\sqrt{E_{cp}}\right|^2}$$

$$= \sqrt{\frac{E_{cd}}{E_{cp}}} s(k,m)$$

As it was previously mentioned, the channel estimate may be provided by any linear filtering process for $p(k,l)$ but the result of (3) will always hold true. It becomes evident, that the MRC output is scaled by the factor $\sqrt{E_{cd}/E_{cp}}$, which needs to be removed in order for $s(k,m)$ to be in its correct decision grid.

For 16-QAM modulation, the possible values for $s(k,m)$ are $-3, -1, 1,$ and $3$. Assuming that the transmitted symbols are independent and identically distributed, a valid assumption in CDMA communications systems, the expected mean for $|s(k,m)|$ is $E[|s(k,m)|]=2$. The expected variance is $var[|s(k,m)|]=1$. The decision for the scaling coefficient of $d(k,m)$ in (3) may be based on a combination of the mean and variance of $|s(k,m)|$ or higher order statistics may also be used.

For the exemplary setup, we consider only the mean of $|d(k,m)|$. The mean of $|d(k,m)|$ over all M HS-DSCH multicodes for the channel estimation observation period of $N_d=16N_p$ is equated to 2 according to:

$$E[|d|] = \frac{1}{16 N_p M} \sum_{k=1}^{16N_p} \sum_{m=1}^{M} |d(k,m)| = 2 \cdot C \quad (4)$$

where C is the scaling coefficient which, from (3) and (4), provides a noisy estimate of $\sqrt{E_{cd}/E_{cp}}$. The data demodulation is then completed by multiplying the output of the MRC in (3) by 1/C. The scaling approach is exactly the same for an equalizer type receiver based on the CPICH.

Notice that the summation in (4) can be over a smaller number of $N_d=16N_p$ data symbols, that is the initial mean estimate of $|d(k,m)|$ may be computed in less than 1 pilot symbol period ($N_d<16N_p$). The number of data symbols considered before obtaining the initial mean estimate of $|d(k,m)|$ should be the minimum one ensuring adequate accuracy to avoid any performance degradation without undue delay. Once the initial mean estimate of $|d(k,m)|$ is available, QAM de-mapping signal and further processing (such as decoding) may commence without further delay. As new data become available, the initial mean estimate of |d(k,m)| is continuously updated by taking into account the new data. For example, after an additional pilot symbol period the new mean estimate of |d(k, m)| is given as $$E[|d|] = \frac{1}{2 \times 16 N_p M} \sum_{k=1}^{2 \times 16 N_p} \sum_{m=1}^{M} |d(k, m)| = 2 \cdot C \qquad (5)$$

In that manner, the accuracy of the mean estimate of |d(k,m)| continuously improves until a new data frame with a possibly different data-to-pilot power ratio is received and the previously described process starts from the beginning.

For zero mean noise, which is typical in communication systems, the noise component n(k,m) omitted from (3) does not have a significant impact on the value of mean estimate of |d(k,m)|. This is because typical SNR values required to support reliable transmission of QAM signals in communication systems are significantly larger than 0 dB. This means that the term d(k,m)+n(k,m) most of the time retains the sign of d(k,m) in (3). In this case, the noise term has a zero net effect on the mean value of d(k,m)+n(k,m) and E[|d+n|]=|E[d+n]|=|E[d]|. Bias in the estimate of |d+n| is introduced only when n(k,m) has the opposite sign of d(k,m) and |n(k,m)|>|d(k,m)|. For example, for 16-QAM and ignoring the common scaling factor from both d(k,m) and n(k,m), the normalized values of d(k,m) are ±1,±3. For d(k,m)=±3, |n(k,m)|≦|d(k,m)| with high probability and E[|d+n|]=|E[d+n]|=|E[d]|. For d(k,m)=±1, the same is true for |n(k,m)|≦1. For d(k,m)=+1 and |n(k,m)|>1, bias is introduced as for positive n(k,m), |d(k,m)+n(k,m)| is increased by n(k,m) while for negative n(k,m), |d(k,m)+n(k,m)| is decreased by |n(k,m)|−1 instead of n(k,m) (similar argument for d(k,m)=−1). Clearly, the only way for the bias in the estimate of |d(k,m)| not to be negligible, is for most of the results in (3) used to obtain the mean estimate of |d(k,m)| to be in error. For such poor SNR conditions, a relatively biased estimate of |d(k,m)| is not the source of performance degradation.

For biased noise, the bias should be removed from the mean estimate of |d(k,m)|. Moreover, for second or higher order statistics of d(k,m), the corresponding contribution of the noise term should be removed. Nevertheless, for the exemplary embodiment of zero-mean noise and computation of the data-to-pilot power ratio based on the mean estimate of |d(k,m)|, the noise term has no impact on the results as verified by the simulations conducted and discussed further below.

In FIG. 1 there is shown a block diagram describing the operations involved in the disclosed invention that are performed by a wireless communication device such as a cellular telephone. The received signal is provided by antenna 110 to receiver section 120. The receiver 120 may be a conventional Rake, an equalizer, or an interference canceller. It performs the operations of despreading and MRC or equalization, as needed by the particular receiver. The output d(k,m) 130 (equation (3)) of receiver 120 is provided to an absolute value circuit 140 to produce the absolute value |d(k,m)| 150. Subsequently, the absolute value |d(k,m)| is provided into a mean estimate circuit 160. The mean estimate device may be implemented as a block, sliding block, exponential, or any other estimate known in the art.

The output 170 of mean estimate circuit 160 is the mean absolute value as described in equation (4). Divider 180 divides output 170 by a value of 2, for the exemplary embodiment of 16-QAM. The resulting output (C) 190 is the estimate of the data-to-pilot power ratio that also provides the scaling factor needed to perform de-mapping for 16-QAM for the exemplary embodiment.

The disclosed invention described an algorithm to adjust for the unknown HS-DSCH-to-CPICH power ratio scaling the data at the output of a Rake or an equalizer receiver. The scaling factor to be removed is proportional to $\sqrt{E_{cd}/E_{cp}}$. This factor can be estimated from the known statistics of the data constellation used to modulate the transmitted signal. The disclosed algorithm evaluates the statistics of the demodulated data symbols and compares them to the known statistics. For the exemplary setup of the mean value, only a summation of the absolute values of the demodulated data symbols at the output of the Rake or equalizer receiver is required. In the exemplary case of 16-QAM the result of the summation is compared to the value of 2 and the appropriate scaling coefficient 1/c is found according to (4).

The proposed power ratio estimation method has minimal latency as the demodulation can proceed without waiting for any additional data. Only processing delay is involved in computing the scaling coefficient. The complexity involved relates only to the summation of the absolute values of the demodulated data symbols which is a negligible portion of the overall receiver complexity. The performance of the disclosed algorithm directly relates to the receiver performance as the power ratio is computed after demodulation. As a result, the power ratio accuracy is ensured for a receiver capable of providing accurate decisions.

From the data-to-pilot power ratio and the pilot SNR estimate, the data SNR estimate can be directly obtained. Because the accuracy of the power ratio and the pilot SNR estimate are much better than the accuracy of a directly obtained data SNR estimate, the method of the disclosed invention can also be used to provide an accurate estimate for the SNR of the data signal which may be needed for power control, signal quality indication, or other purposes. The pilot SNR estimate may be computed by any of the methods known in the prior art.

Figure 2:
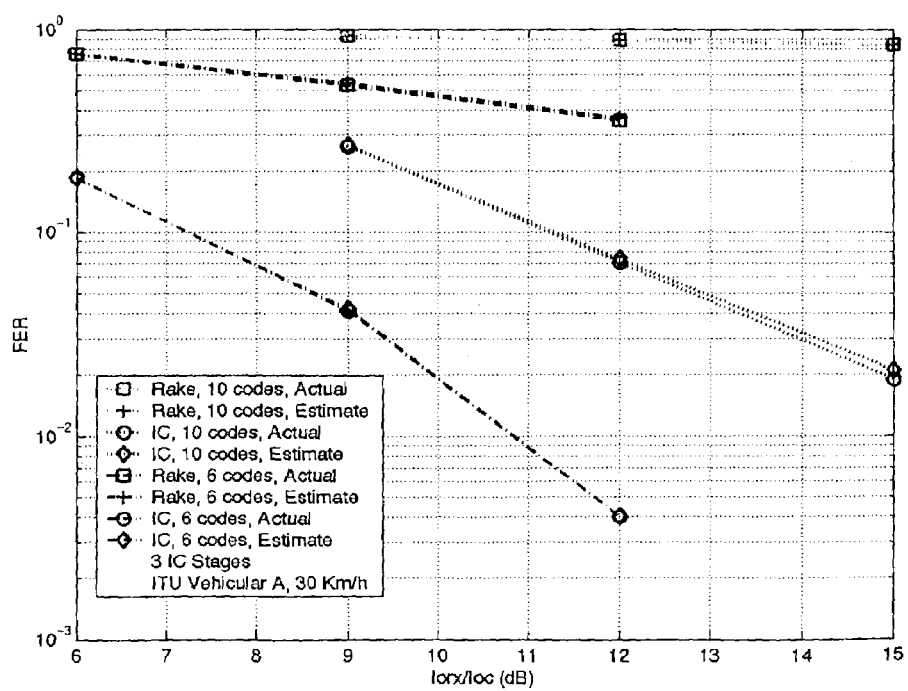
FIG. 2 shows a chart of Frame Error Rate (FER) compared to estimated and actual data-to-pilot power ratios for different receivers.

Simulation results are now briefly presented in FIG. 2 to verify the effectiveness of the proposed method. The performance of the disclosed invention is compared to the one with perfect knowledge of the data-to-pilot power ratio for the conventional Rake receiver and a parallel interference canceller (IC). The modulation is 16-QAM, the number of transmitted HS-DSCH data signals is 6 or 10, and the turbo code rate is ½ or ¾. The frame error rate (FER) is plotted versus the ratio Iorx/Ioc, also known as geometry, specifying the ratio of intracell-to-intercell received power spectral density. The common pilot channel (CPICH) is transmitted with 10% of the total transmit power and the remaining 90% is equally allocated among the HS-DSCH data signals. The channel model is the ITU-specified Vehicular A model. The data-to-pilot power ratio is first computed based on data observed after 1 CPICH symbol period (latency of 1 CPICH symbol period) and is continuously updated as more data become available. Observe that in all cases the performance with the estimated data-to-pilot power ratio is virtually identical to the one obtained with perfect knowledge of this ratio. The only minor difference occurs at high values of Iorx/Ioc for 10 HS-DSCH transmitted signals. It is only at very high SNRs that the inaccuracies in the estimation of the power ratio start introducing minor performance degradations. For the low and moderate SNR values, the estimated power ratio inaccuracies do not affect the performance that is dominated by the effect of the interference and other inaccuracies such as channel estimation and timing ones. The robustness and accuracy for the method of the disclosed invention are demonstrated by its practically ideal performance at low and moderate SNRs and by its minimal SNR losses at high SNR values. For all FER values of interest, the performance with data-to-pilot power ratio estimation and is practically identical to the one obtained with perfect knowledge of that ratio.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a communication system that transmits at least one data signal, a communication device having an output, the communication device having a receiver and demodulating the at least one data signal, the communication device performing a method, the method comprising the steps of:
   (a) taking the absolute values of the at least one data signal at the output of the receiver;
   (b) accumulating the absolute values;
   (c) using the accumulated absolute values and a predetermined number to obtain a scaling factor;
   (d) using the scaling factor to scale the at least one data signal at the output of the receiver and obtain at least one scaled result; and
   (e) using the at least one scaled result from step (d) to perform the demodulation of the at least one data signal at the output of the receiver.

2. A method as defined in claim 1, wherein the receiver comprises a Rake receiver.

3. A method as defined in claim 1, wherein the receiver comprises an equalizer.

4. A method as defined in claim 1, wherein the receiver comprises an interference canceller.

5. A method as defined in claim 1, wherein the at least one data signal carries information intended for the communication device.

6. A method as defined in claim 1, wherein the communication system comprises a CDMA communication system transmitting at least one data signal and a pilot signal and the communication device determines the power ratio between the data and pilot signals.

7. A method as defined in claim 1, wherein in step (c) the communication device divides the accumulated absolute values using the predetermined number to obtain a scaling factor.

8. A method as defined in claim 6, wherein the communication device obtains a signal-to-noise ratio estimate for the at least one data signal using the power ratio of the at least one data signal and the pilot signal and a signal-to-noise ratio estimate of the pilot signal.

9. A method as defined in claim 1, further comprising the steps of:
   (f) taking additional absolute values of the at least one data signal at the output of the receiver;
   (g) accumulating the additional absolute values;
   (i) using the accumulation result in step (g) and a predetermined number to obtain a new scaling factor;
   (j) using the new scaling factor to scale the at least one data signal at the output of the receiver and obtain at least one new scaled result; and
   (k) using the at least one new scaled result of step (j) to perform demodulation of the at least one data signal at the output of the receiver.

10. In a communication system with transmission of at least one data signal and a pilot signal, a communication device having a receiver and operable in the communication system for determining the power ratio between the data and pilot signals, the communication device performing a method, the method comprising the steps of:
    (a) taking absolute values of the at least one data signal at the output of the receiver;
    (b) accumulating the absolute values to obtain a first value;
    (c) using the first value with a first predetermined number to obtain a first scaling factor;
    (d) accumulating the pilot signal values at the output of the receiver to obtain a second value;
    (e) using the second value with a second predetermined number to obtain a second scaling factor, and
    (f) using the first scaling factor in step (c) and the second scaling factor in step (e) to obtain an estimate for the power ratio of the at least one data signal and the pilot signal.

11. A method as defined in claim 10, wherein the receiver comprises an equalizer.

12. A method as defined in claim 10, wherein the receiver comprises an interference canceller.

13. A method as defined in claim 10, wherein the receiver comprises a Rake receiver.

14. A method as defined in claim 10, wherein the communication device obtains a signal-to-noise ratio estimate for the at least one data signal using the power ratio of the at least one data signal and the pilot signal and a signal-to-noise ratio estimate of the pilot signal.

15. A method as defined in claim 10, wherein the at least one data signal carries information intended for the communication device.

16. A method as defined in claim 10, wherein the communication system comprises a CDMA communication system transmitting at least one data signal and a pilot signal and the communication device determines the power ratio between the data and pilot signals.

17. A method as defined in claim 10, wherein in step (c) the communication device divides the accumulated absolute values using the predetermined number to obtain the scaling factor.

18. A method as defined in claim 10, further comprising the steps of:
    (f) taking additional absolute values of the at least one data signal at the output of the receiver;
    (g) accumulating the additional absolute values;
    (i) using the accumulation result in step (g) and a predetermined number to obtain a new scaling factor;
    (j) using the new scaling factor to scale the at least one data signal at the output of the receiver and obtain at least one new scaled result; and
    (k) using the at least one new scaled result of step (j) to perform the demodulation of the at least one data signal at the output of the receiver.

* * * * *